United States Patent [19]
Frese et al.

[11] 3,959,409
[45] May 25, 1976

[54] PROCESS FOR THE PRODUCTION OF CRYSTALLINE PROPENE-ETHENE-BUTENE-1 TERPOLYMERS

[75] Inventors: Albert Frese; Fritz Baxmann; Walter Dittmann; Johann Dietrich, all of Marl, Germany

[73] Assignee: Chemische Werke Huls Aktiengesellschaft, Marl, Germany

[22] Filed: Oct. 16, 1974

[21] Appl. No.: 515,334

[30] Foreign Application Priority Data
Oct. 23, 1973  Germany............................ 2352980

[52] U.S. Cl. ........................ 260/878 B; 526/79; 526/154; 526/158; 526/348; 528/503
[51] Int. Cl.² .............. C08F 297/08; C08F 210/08; C08F 210/16
[58] Field of Search ................. 260/80.78, 878 B

[56] References Cited
UNITED STATES PATENTS

| | | | |
|---|---|---|---|
| 2,918,457 | 12/1959 | Jezl | 260/88.2 |
| 3,002,961 | 10/1961 | Kirschner et al. | 260/93.7 |
| 3,162,620 | 12/1964 | Gladding | 260/80.78 |
| 3,197,452 | 7/1965 | Natta et al. | 260/93.7 |
| 3,332,921 | 7/1967 | Cleary | 260/88.2 |
| 3,378,606 | 4/1968 | Kontos | 260/878 B |
| 3,461,110 | 8/1969 | Rice et al. | 260/93.7 |
| 3,520,859 | 7/1970 | Schrage et al. | 260/80.78 |
| 3,705,884 | 12/1972 | Frese | 260/80.78 |

*Primary Examiner*—Alan Holler
*Attorney, Agent, or Firm*—Millen, Raptes & White

[57] ABSTRACT

In a low pressure process for the production of crystalline propene-ethene-butene-1 terpolymers with 0.2 to 10% by weight of ethene and 0.2 to 5% by weight of butene-1 with the aid of mixed catalysts of $TiCl_3$ or $TiCl_3 \cdot n\ AlCl_3$ (n = 0.2 to 0.6), and chlorine-containing organoaluminum compounds, the improvement comprising conducting the polymerization in butene-2 or in a $C_4$-cut containing 20-99% butene-2, containing 0.1 – 2.5% of butene-1, with the addition of 0.2 to 10% of ethene, based on the amount of propene employed.

10 Claims, No Drawings

PROCESS FOR THE PRODUCTION OF CRYSTALLINE PROPENE-ETHENE-BUTENE-1 TERPOLYMERS

BACKGROUND OF THE INVENTION

This invention relates to a process for the production of crystalline propene-ethene-butene-1 terpolymers with up to 10% by weight of ethene and up to 5% by weight of butene-1 in accordance with the low-pressure method with the aid of mixed catalysts of crystalline $TiCl_3$ and/or $TiCl_3 \cdot n \, AlCl_3$ ($n = 0.2$ to $0.6$), on the one hand, with chlorine-containing organoaluminum compounds, on the other hand, optionally in the presence of hydrogen.

In accordance with a process not pertaining to the state of the art (German Patent Application P 23 38 478.3 corresponding to copending, commonly assigned U.S. Pat. Application Ser. No. 491,172, filed July 23, 1974), an isotactic polypropylene and/or a crystalline copolymer thereof with up to 10% butene-1 is obtained by polymerization of propene in butene-2 or in a butene-2-containing $C_4$-cut which can include up to 5% of butene-1. The polymerization in butene-2 or a $C_4$-cut containing butene-2 has the advantage that the propylene can also be polymerized at moderate pressures with the use of evaporative cooling, and that the thus-obtained polypropylene can be processed by means of a simple operation.

The polymers produced according to this process have a high isotactic proportion and accordingly show high yield points with comparably good notch impact strength values. It is desirable for various fields of application to still further increase the notch impact strength values of these polymers.

It is known that the impact strength toughness of polypropylene can be increased by the copolymerization of propene with ethene. This is generally accomplished by a stepwise polymerization. According to this method, one monomer, e.g. the propene, is first polymerized. After the polymerization of this monomer, e.g. the propene, the unreacted propene monomer is adiabatically expanded, optionally thereafter purged with an inert gas, and only then is the second monomer, preferably ethene, added and polymerized. This stepwise polymerization of propene and ethene can optionally be repeated several times for the production of block copolymers. By polymerization in several stages, the formation of amorphous propene-ethene copolymers which impede processing and lower the strength values is prevented. However, this procedure has the great disadvantage that it is very complicated and expensive due to the required removal of residual monomer. Furthermore, larger amounts of ethene are required in this procedure to improve the notch impact strength, namely about 15 – 30%, based on the propene.

Consequently, there is interest in a process making it possible to produce a polypropylene having an improved impact strength by a simple operation during both polymerization and subsequent processing.

OBJECTS OF THE INVENTION

Accordingly, it is an object of this invention to provide a process for preparing improved copolymers of propylene and one or more α-olefins.

Another object of this invention is to provide a low-pressure process for preparing high impact strength propylene copolymers.

A further object of this invention is to provide a low pressure process for preparing propylene copolymers of high notch impact strength.

An additional object of this invention is to provide a process for preparing propylene copolymers having a high molecular weight.

Upon further study of the specification and appended claims, further objects and advantages of this invention will become apparent to those skilled in the art.

SUMMARY OF THE INVENTION

Briefly, the above and other objects are attained in one aspect of this invention by providing a process for the production of crystalline terpolymers of propene, ethene and butene-1 by low-pressure copolymerization of propene with an α-olefin comonomer selected from the group consisting of 0.2–10% by weight of ethylene, 0.2 – 5% by weight butene-1 and mixtures thereof, which comprises the combination of employing a mixed polymerization catalyst consisting essentially of a) titanium trichloride and b) a chlorine-containing organoaluminum compound in a molar ratio Al:Ti of 1.1–3.0 and conducting the polymerization as a liquid phase polymerization employing a polymerization solvent consisting essentially of butene-2 or a $C_4$-hydrocarbon cut containing 20 to 99 molar percent of butene-2 and 0.1–2.5% butene-1.

DETAILED DISCUSSION

In the process of the present invention, the polymerization of propene is conducted in butene-2 or in a butene-2-containing $C_4$-cut containing 0.1–2.5% of butene-1, with the addition of about 0.2 – 10% ethene, based on the amount of propene employed.

According to numerous publications, butene-2 was expected to be entirely unsuitable as a diluent, since it is isomerized, as set forth by the majority of literature references, to butene-1 under the influence of Ziegler-Natta catalysts and is polymerized to polybutene in the presence of catalysts; see U.S. Pat. No. 2,956,989, German Unexamined Laid-Open Application DOS 1,545,042, French Pat. No. 1,415,239, R.O. Symcox (J. Polymer Sci., Part B, 2 (1964) No. 10, pp. 947–949), T. Otsu et al. (J. Polymer Sci., A 4 (1966) No. 6, pp. 1579–1593), and others. It could not be foreseen that propene, contrary to these disclosures, can be very advantageously polymerized with Ziegler-Natta catalysts in butene-2, thus obtaining a crystalline polymer. Surprisingly, it is even possible to obtain, in butene-2 containing minor amounts (e.g. 0.1 – 2.5%) of butene-1, after the addition of ethene, crystalline propene-ethene-butene-1 terpolymers. These terpolymers contain only such an amount of butene-1 as corresponds to the butene-1 content in the butene- 2.

Suitable for the process is a butene-2 and/or a $C_4$-cut containing butene-2 with a butene-1 proportion of 0.1–2.5%, preferably 0.1–1.5%. The proportion of isobutene should, if possible, not exceed 0.5%. A preferred butene-2-butane-butene-1 mixture is the sump product obtained in butene-1 concentration from $C_4$-cuts, for which no field of application has heretofore been indicated. Surprisingly, the polymerization speed of propene in butene-2 and/or in butene-2-enriched $C_4$-cuts, as in butene-2-butane mixtures, is substantially higher than in pure butane.

The polymerization is conducted in the liquid phase with the aid of Ziegler-Natta catalysts at temperatures of up to about 100°C, preferably at 30°–80°C, especially at 40°–60°C, and under pressure of up to about 25 atmosphere gauge, preferably up to 20 atm. gauge, especially 4–16 atm. gauge. At lower polymerization temperatures, polymers are obtained having a higher crystalline proportion. Lower polymerization temperatures are of particular interest when using higher butene-1 and ethene quantities, for example butene-1 > 1%, ethene > 2%. The polymerization can be effected continuously and/or discontinuously.

Suitable Ziegler-Natta catalysts are mixed catalysts from titanium(III) chlorides and chlorine-containing organometallic compounds of aluminum. Suitable titanium trichlorides are preferably titanium aluminum chlorides of the composition $TiCl_3 \cdot n\, AlCl_3$ (n = 0.2 to 0.6), in particular in the $\gamma$- and $\Delta$-modification, which can be produced by the reduction of titanium tetrachloride with metallic aluminum or organoaluminum compounds and optional activation, e.g., by grinding. The titanium aluminum chlorides obtained by reduction with organoaluminum compounds are preferably tempered after the reduction for 4 to 8 hours in a nitrogen or a hydrocarbon atmosphere at temperatures of 70°–150 °C. During the reduction with organoaluminum compounds, the thus-obtained titanium trichloride can be separated from the major quantity of the organoaluminum compound by decanting or filtration. However, it is also possible to utilize the product without isolation together with the organoaluminum compound, especially with alkyl aluminum dichloride.

Suitable chlorine-containing organoaluminum compounds are preferably the dialkyl aluminum chlorides, particularly diethylaluminum chloride. If the titanium trichloride with alkyl aluminum dichloride is utilized in unisolated form, the latter is converted by reaction with a trialkyl aluminum compound, preferably triethylaluminum, into the dialkyl aluminum chloride, e.g., the diethylaluminum chloride. Also suitable as chlorine-containing organoaluminum compounds are the alkyl aluminum sesquichlorides and the alkyl aluminum dichlorides, preferably in combination with electron donors.

The titanium trichloride or the titanium aluminum chloride is used in catalytic amounts, e.g. generally of 0.1–3 millimoles/liter. The molar ratio of Al:Ti is preferably 1.1:1 to 3.0:1, especially 1.3:1 to 2.0:1.

The ethene quantity added thereto is up to 10%, preferably 1–4%, especially 1–3%, based on the propene which is used. The amount of ethene added thereto is dependent on the butene-1 content of the utilized butene-2 and/or the butene-2-containing $C_4$-cut. In case of a butene-1 content in the diluent of about 0.3%, this amount of ethene is preferably 2–4%, with a butene-1 content of about 0.6%, it is preferably 2–3%, with a butene-1 content of about 1.0%, it is preferably 1–2%. The aforementioned amounts of ethene are favorable, in particular, if the ethene is added only at a conversion of 60–70%, based on the total conversions. If the ethene is added at a later point in time, larger quantities of ethene, e.g., of 4 to 10%, based on the propene employed, can also be advantageous. In case of an early addition of ethene and/or in case of a continuous introduction of ethene during the entire polymerization time, smaller amounts of ethene are more advantageous. When adding ethene at regular time intervals, e.g. hourly, larger amounts of ethene are preferably added than when adding ethene continuously during the entire polymerizing period.

In these polymerizations of propene in butene-2 with minor amounts of butene-1, with the addition of minor amounts of ethene, 90–100% of the propene is polymerized, and about 20–100% of the ethene, about 30–90% of the butene-1, while the butene-2 is not at all detectable by infrared spectroscopy.

The propene-ethene-butene-1 terpolymers obtained according to this process surprisingly exhibit a substantially higher impact strength toughness than the conventional propeneethene copolymers, with simultaneously higher break tensile strength and elongation at rupture values as determined by DIN 53,455. A further advantage of this process is that these substantially more favorable properties are obtained with considerably lower additions of co- and/or termonomers. The ethers can be added either discontinuously or continuously over the entire polymerization time, or only during a partial time period during the polymerization. Furthermore, this addition can take place at a certain instant and/or at specific time intervals. If, in the continuous polymerization of propene in series-connected reactors, the ethene is introduced into the second polymerization reactor, or only into the third polymerization reactor, polymers are produced having improved toughness with high strength values and low heptane-soluble proportions. The same holds true for the addition of ethene during discontinuous polymerization. The ethene is preferably introduced after a conversion of more than 50%, based on the total conversion, particularly after a conversion of more than 75% has been reached. However, as contrasted to the conventional polymerization methods using stepwise polymerization, it is unnecessary in this process to remove the previously used monomer before adding the next one.

Due to the high yield stress values and the low heptane-soluble proportions, it is unnecessary in the polymers obtained according to the present process to separate the proportions dissolved in the solvent during the working-up operation. The use of butene-2 as the diluent is particularly advantageous for passing the thus-produced propene-ethene-butene-1 terpolymer suspension through nozzles. The fact that the amorphous, dissolved components need not be separated renders the working-up procedure in this process particularly simple and economical.

The regulation of the molecular weight is optionally accomplished by adding hydrogen, preferably 0.0005 to 0.05% by weight, based on the propene utilized, especially 0.001 to 0.01% by weight or approximately 0.02 – 2 Nl (liters at 0°C and 1 atm. abs.) of hydrogen per liter of liquid propene.

The characteristic values indicated in the examples were determined on pressed sheets produced from the polyolefin powder. The values determined on pressed sheets produced from granulated material are, on the average, 10% higher.

In the following examples, the physical properties set forth were determined according to standard testing techniques. Relative Solution Viscosity (RSV) was determined in an Ostwald-type viscosimeter. Viscosity average molecular weight was measured according to lg $$\overline{M}_v = \frac{lg/RSV/-lg}{3.26 \cdot 10^{-4}}$$
$$0.77$$

Weight average ($\overline{M}_w$) molecular weights were obtained from gel chromatography measurements according to J. C. Moore, J. Poly. Sci. A 2:835 (1964). Number average ($\overline{M}_n$) molecular weights were obtained from dispersion methods. Bulk density values were measured according to DIN 53468 = ISO R 60. Melt Index values (MI) are measured according to DIN 53 735. Yield stress, break tensile strength and elongation at rupture were determined according to DIN 53 455, while notch impact strength was determined according to DIN 53 453. IR analysis was conducted with a NaCl prism spectrometer (Perkin Elmer M21).

The term "polypropylene" as applied to the products of the examples refers to the resultant copolymers having many of the characteristic physical properties of crystalline, isotactic polypropylene.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLE 1

With the aid of 0.014 part by weight of a $TiCl_3$ catalyst having the composition $TiCl_3 . 0.33 AlCl_3$ (predominantly Δ-modification, or technical aluminum-reduced titanium trichloride) and 0.020 part by weight of diethyl-aluminum chloride, 20 parts by weight of propene (99% strength) is polymerized at 50°C under a pressure of 9–5 atm. gauge after adding 0.0002 part by weight of hydrogen, in 50 parts by weight of a butene-2-butene-1-butane mixture comprising 39.2% trans-butene-2, 19.8% cis-butene-2, 39.8% n-butane, 1.0% butene-1 and 0.2% isobutene. After a polymerization time of 5 hours, 0.4 part by weight of ethene is introduced under pressure. After a further polymerization time of 5 hours, the polymerization is stopped by adding 0.1 part by weight steam. By passing the suspension through adiabatic expansion nozzles, a pourable powder is obtained consisting essentially of a propene-ethene-butene-1 terpolymer having the characteristic values as shown in the Table.

EXAMPLE 2

Following the procedure of Example 1, but adding only 0.00015 part by weight of hydrogen instead of 0.0002 by weight of hydrogen, a polymer is obtained having the characteristic values shown in the Table.

EXAMPLE 3

If, according to the method of Example 1, 0.2 part by weight of ethene is added, a polymer is produced with the properties shown in the Table.

COMPARATIVE EXAMPLE 4

Following the procedure of Example 1, but without adding ethene, a polymer is produced with the characteristics shown in the Table.

EXAMPLE 5

Following the procedure of Example 1, polymerization is carried out in a $C_4$-cut comprising 39.4% trans-butene-2, 19.9% cis-butene-2, 40.0% butane, 0.6% butene-1 and 0.1% isobutene. After adding the indicated amounts of ethene, copolymers are obtained having the characteristics shown in the Table.

EXAMPLE 6

With the aid of the catalyst comprising 0.03 parts by weight of the $TiCl_3 . 0.33 AlCl_3$ described in Example 1 and 0.04 parts by weight of diethylaluminum monochloride, 18 parts by weight of propene (99%) is polymerized at 50° C. under a pressure of 9–5 atm. gauge in 40 parts by weight of a butene-2-rich $C_4$-cut comprising 38% trans-butene-2, 31% cis-butene-2, 30.5% butane and 0.5% butene-1, after adding (a) 0.0003 part by weight and (b) 0.0006 part by weight of hydrogen. During the entire polymerization time of 5 hours, 0.36 part by weight of ethene is uniformly added to the reaction mixture. Thereafter, the polymerization is stopped by adding 0.2 part by weight of water. After adiabatic expansion, a propene-ethene-butene-1 terpolymer is obtained having the characteristic values shown in the Table.

EXAMPLE 7

Following the procedure of Example 6(a) in a butene-2-rich $C_4$-cut containing 1.5% butene-1, a polypropene is obtained with the property values shown in the Table.

COMPARATIVE EXAMPLE 8

With the aid of the catalyst described in Example 6, 18 parts by weight of propene is polymerized in 50 parts by weight of hexane at 50° C. after adding 0.0003 part by weight of hydrogen under a pressure of 8–3 atm. gauge. After a polymerization time of 5 hours, the unreacted propene is adiabatically expanded. Thereafter, 4.5 parts by weight of ethene and 0.0003 part by weight of hydrogen are introduced under pressure, and the polymerization is conducted for 1 hour at 50° C. The polymerization is stopped by adding 0.2 part by weight of water; the polymer is separated by means of a conventional separating device and dried. The thus-obtained product has the characteristics as shown in the Table.

In spite of the substantially more complicated polymerization and working-up process, the notch impact strength values, the break tensile strength and the elongation at rupture values are all substantially poorer even as compared to the polymer of Example 6(b) having a considerably lower molecular weight.

EXAMPLE 9

With the aid of a catalyst of 0.014 part by weight of the $TiCl_3 . 0.33 AlCl_3$ described in Example 1 and 0.022 part by weight of diethylaluminum chloride, 20 parts by weight of propene (99%) is polymerized under a pressure of 14–9 atm. gauge and a temperature of 70° C. after adding 0.00015 part by weight of hydrogen in 60 parts by weight of a butene-2-rich $C_4$-cut containing 0.4% of butene-1. After a polymerization period of 6 hours, 1.0 part by weight of ethene is introduced under pressure, and the polymerization is continued for another 4 hours. After passing the reaction mixture through nozzles in the presence of 0.1 part by weight of steam, a propene-ethene-butene-1 terpolymer is obtaining having the properties as shown in the Table.

EXAMPLE 10

By conducting the polymerization according to the procedure of Example 9 in a butene-2-rich C$_4$-cut containing 1.0% of butene-1, but at 70° C. instead of at 50° C. and by adding only 0.5 part by weight instead of 1 part by weight of ethene, a polypropene block copolymer is obtained having comparable characteristics as shown in the Table.

COMPARATIVE EXAMPLE 11

With the aid of the catalyst described in Example 9, 20 parts by weight of propene (99%) is polymerized, under a pressure of 10–14 atm. gauge in 60 parts by weight of hexane at 70° C. after adding 0.00015 part by weight of hydrogen. After a polymerization time of 10 hours, the unreacted propene is expanded. Then, 5 parts by weight of ethene and 0.00015 part by weight of hydrogen are introduced into the reactor under pressure and the polymerization is conducted for 2 hours at 70° C. After working up the reaction product in accordance with Comparative Example 3, a polypropene is obtained having the characteristics as shown in the Table.

According to IR analysis, the propene-ethene block copolymer contains 19% molar polyethene. This propene-ethene block copolymer exhibits substantially poorer notch impact strength values, as well as lower break tensile strength and elongation at rupture values than the propene-ethene-butene-1 terpolymers of this invention.

EXAMPLE 12 a. Preparation of a TiCl$_3$ . 0.5 AlCl$_3$ Catalyst

One mole of titanium tetrachloride is gradually added dropwise under agitation over 8 hours to a 20% solution of 1.4 moles of ethyl aluminum sesquichloride in hexane, cooled to −5° C. After a secondary reaction period of 12 hours at −5°C. to +10° C., the catalyst suspension is conventionally tempered for 6 hours at 130° C. Thereafter, the precipitated catalyst is removed by decanting and then washed twice with butane. In a practically quantitative yield, 1 mole of a titanium trichloride catalyst is obtained having the composition TiCl$_3$ . 0.51 AlCl$_3$.

b. Polymerization

With the aid of a mixed catalyst of 0.015 part by weight of this TiCl$_3$ catalyst and 0.024 part by weight of diethylaluminum monochloride, 20 parts by weight of propene (99%) is polymerized in 50 parts by weight of a butene-2-rich C$_4$-cut containing 1.0% of butene-1, at 50° C. after the addition of 0.0003 part by weight of hydrogen and under a pressure of 10–5 atm. gauge. After a polymerization period of 4 hours, 0.6 part by weight of ethene is introduced under pressure and the polymerization continued for another 2 hours. Thereafter, the thus-obtained polymer suspension, after adding 0.2 part by weight of steam, is passed through spray drying nozzles into a second vessel. The thus-produced propene-ethene-butene-1 terpolymer has the characteristic values as shown in the Table.

COMPARATIVE EXAMPLE 13

For comparison purposes, propene was polymerized with the catalyst utilized in Example 12 in accordance with the method of Comparative Example 8 as shown in the Table.

The comparative example shows that the thus-produced propene-ethene block copolymer, in spite of the substantially higher polyethylene proportion, though having very good yield stress values, exhibits considerably lower notch impact strength, break tensile strength and elongation at rupture values than, for example, the terpolymer of Example 5(c) which is comparable in molecular weight.

EXAMPLE 14

With the aid of a mixed catalyst of 0.023 part by weight of the titanium trichloride produced in Example 12(a) and 0.033 part by weight of diethylaluminum monochloride, 15 parts by weight of propene (99%) is polymerized at 50° C. under a pressure of 9–5 atm. gauge in 60 parts by weight of a butene-2-rich C$_4$-cut (ca. 60% butene-2) containing 0.5% of butene-1, after adding 0.0004 part by weight of hydrogen. After each hour, 0.09 part by weight of ethene is introduced under pressure, five times in total. After six hours, the polymerization is stopped by adding 1 part by weight of methanol. The thus-obtained polymer suspension is passed through nozzles into a second container. The thus-produced polymer has the properties as shown in the Table.

EXAMPLE 15 a. Production of a TiCl$_3$ . 0.5 AlCl$_3$ Catalyst Suspension

One mole of titanium tetrachloride is gradually added dropwise under agitation over 8 hours, to a 20% solution of 1.4 moles of ethyl aluminum sesquichloride in butane, cooled to −5° C. For the secondary reaction, the suspension is agitated for 15 hours at −5° C. to +10° C. and the catalyst is thereafter tempered at 130° C.

b. Polymerization

A pressure-tight agitator-equipped vessel is continuously fed at 60° C. with 600 parts by weight per hour of a C$_4$-cut rich in butene-2 (ca. 70% butene-2) containing 0.5% of butene-1, the catalyst suspension produced in part (a) of this Example, one mole (1.14 parts by weight) of triethyl-aluminum, 0.003 part by weight of hydrogen and 250 parts by weight of propene. The polymerization is effected in three series-connected reactors under a pressure in the first reactor of about 11 atm. gauge, about 8 atm. gauge in the second reactor and about 7 atm. gauge in the third reactor. Ten parts by weight per hour of ethene is charged continuously into the third reactor. The average residence time in each vessel is about 5 hours. From the third vessel, the thus-produced polymer suspension is passed through nozzles into a fourth container via a level-controlled check valve element, while adding 5 parts by weight per hour of steam. The thus-produced propene-ethanebutene-1 terpolymer has the characteristic values as shown in the Table.

TABLE

| PROPERTIES | EXAMPLES | | | | | | | | |
|---|---|---|---|---|---|---|---|---|---|
| | 1 | 2 | 3 | 4 | 5(a) | 5(b) | 5(c) | 6(a) | 6(b) |
| Part by Weight Ethene Added | | | | | 0.4 | 0.6 | 0.8 | | |
| RSV, dl./g. Ostwald Viscosimeter | 3.7 | 4.5 | 3.4 | 4.2 | 3.6 | 3.1 | 3.0 | 3.3 | 2.1 |
| $MI_{190/5}$ g./10 min. DIN 53 735 | 2.1 | 1.0 | 3.1 | 1.5 | 2.0 | 4.4 | 6.5 | 3.4 | 23.9 |
| Bulk Density, g./l. DIN 53 468 | 306 | 340 | 318 | 324 | 328 | 316 | 307 | 367 | 409 |
| Heptane Extract, % | 8.0 | 6.1 | 7.1 | 6.7 | 6.7 | 7.5 | 9.8 | 8.3 | 6.7 |
| Yield Stress, kp./cm² DIN 53 455 | 281 | 281 | 306 | 310 | 297 | 277 | 272 | 263 | 284 |
| Break Tensile Strength, kp./cm² DIN 53 455 | 454 | 415 | 405 | 362 | 391 | 335 | 422 | 446 | 373 |
| Elongation at Rupture, % DIN 53 455 | >800 | 684 | >738* | 603* | >746* | >666* | 685 | >794* | >770* |
| Notch Impact Strength, kp.cm./cm² DIN 53 453 | | | | | | | | | |
| 20° C. | 12.9 | 16.0 | 8.0 | 6.5 | 10.3 | 10.2 | 10.8 | 12.8 | 7.9 |
| 0° C. | 4.7 | 5.8 | 2.7 | 2.2 | 3.4 | 3.7 | 5.5 | 3.9 | 2.9 |
| −20° C. | 3.2 | 3.7 | 2.2 | 2.0 | 2.6 | 2.9 | 3.5 | 2.8 | 2.4 |
| IR Analysis (NaCl prism spectrometer) | | | | | | | | | |
| $C_4$ (butene-1), % | 1.7 | 1.6 | 1.4 | 1.1 | 0.7 | 1.1 | 0.8 | 0.6 | 0.6 |
| $C_2$ (ethene), % | 0.8 | 0.7 | 0.4 | — | 0.9 | 1.1 | 1.5 | 4.1 | 3.2 |

*In at least one test specimen, the elongation at rupture is >800% (measuring limit).

| PROPERTIES | EXAMPLES | | | | | | | | |
|---|---|---|---|---|---|---|---|---|---|
| | 7 | 8 | 9 | 10 | 11 | 12 | 13 | 14 | 15 |
| RSV, dl./g. Ostwald Viscosimeter | 2.8 | 3.0 | 4.3 | 4.6 | 4.0 | 3.1 | 3.0 | 2.5 | 4.6 |
| $MI_{190/5}$ g./10 min. DIN 53 735 | 6.9 | 4.5 | 0.9 | 2.0 | 2.1 | 3.6 | 4.2 | 9.4 | 1.1 |
| Bulk Density, g./l. DIN 53 468 | 345 | 4.3 | 9.7 | 7.6 | 4.2 | 7.7 | 4.1 | 7.0 | 8.6 |
| Heptane Extract, % | 12.7 | 302 | 373 | 326 | 296 | 408 | 310 | 397 | 296 |
| Yield Stress, kp./cm² DIN 53 455 | 257 | 326 | 267 | 270 | 270 | 294 | 306 | 267 | 268 |
| Break Tensile Strength, kp./cm² DIN 53 455 | 365 | 294 | 477 | 460 | 302 | 428 | 278 | 452 | 452 |
| Elongation at Rupture, % DIN 53455 | 741 | 603 | 765 | 759 | 580 | 790 | 583 | >800 | >800 |
| Notch Impact Strenght, kp.cm./cm² DIN 53 453 | | | | | | | | | |
| 20°C. | 11.5 | 6.0 | 24.0 | 23.1 | 8.5 | 22.4 | 6.2 | 8.5 | 25.8 |
| 0° C. | 4.2 | 2.3 | 6.4 | 8.7 | 2.9 | 6.7 | 2.7 | 5.9 | 12.7 |
| −20°C. | 2.7 | 1.9 | 3.5 | 3.6 | 2.5 | 3.7 | 2.2 | 3.0 | 3.7 |
| IR Analysis (NaCl prism spectrometer) | | | | | | | | | |
| $C_4$ (butene-1), % | 4.3 | | 0.9 | 1.7 | | 1.8 | — | 2.2 | 0.4 |
| $C_2$ (ethene), % | 3.4 | 18.0 | 3.6 | 2.4 | 19.0 | 1.0 | 18.0 | 1.1 | 4.2 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A low pressure polymerization process for the production of crystalline propene-ethene-butene-1 terpolymers containing 0.2–15% by weight ethene and 0.2–5% by weight butene-1, which comprises:
    polymerizing propene with 0.2–10% by weight ethene and 0.1–2.5% by weight butene-1, based on the propene, in the liquid phase with a mixed polymerization catalyst suspension consisting essentially of a) a titanium chloride component of the formula $TiCl_3$ or $TiCl_3 \cdot n\ AlCl_3$ wherein n = 0.2–0.6 and b) a chlorine-containing organoaluminum compound in an Al:Ti molar ratio of 1.1–3.0 in a polymerization solvent consisting essentially of butene-2 or a $C_4$-cut containing 20-99% by weight butene-2 to form said crystalline terpolymers.

2. A process according to claim 1, wherein catalyst component b) is diethylaluminum chloride.

3. A process according to claim 1, wherein the Al:Ti molar ratio is 1.3:1 to 2.0:1.

4. A process according to claim 1, wherein the ethene is added continuously during the polymerization period.

5. A process according to claim 1, wherein the addition of ethene takes place at intermittent time intervals.

6. A process according to claim 1, wherein ethene is added after a conversion of more than 50%, based on the final polymer product.

7. A process according to claim 6, wherein ethene is added after a conversion of more than 75%.

8. A process according to claim 1, wherein said polymerization solvent contains 0.1–1.5% by weight butene-1 and not more than 0.5% by weight isobutene.

9. A process according to claim 1, further comprising working up the resultant reaction mixture by adiabatic expansion thereof.

10. A process according to claim 1, wherein the catalyst is one in which component a) is $TiCl_3 \cdot n\ AlCl_3$, component b) is diethylaluminum chloride and the molar ratio of Al:Ti is 1.3:1 to 2.0:1, the polymerization solvent is a $C_4$-cut containing 0.1–1.5% by weight butene-1 and not more than 0.5% by weight isobutene;

and the ethene is added after a conversion of more than 50%, based on the total conversion, has been reached.

* * * * *